C. L. CARTER.
TRIP AND STATION INDICATOR.
APPLICATION FILED OCT. 31, 1913.
1,133,005.
Patented Mar. 23, 1915.
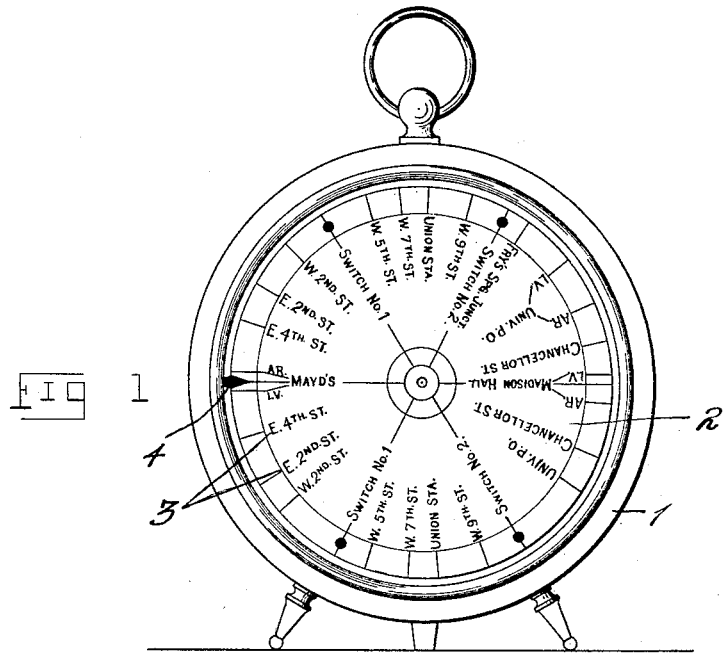
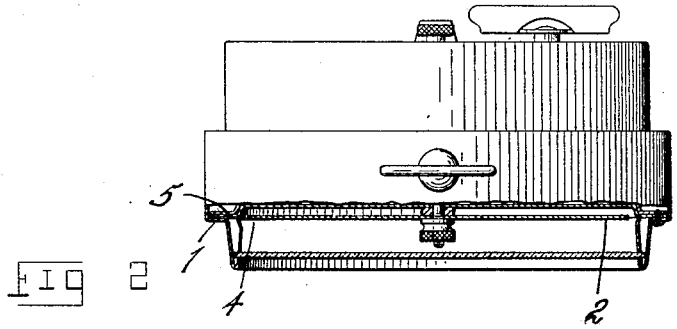
WITNESSES:
B. P. Faltin
INVENTOR
Custis L. Carter.
BY
John J. Thompson
ATTORNEY

UNITED STATES PATENT OFFICE.

CUSTIS L. CARTER, OF CHARLOTTESVILLE, VIRGINIA.

TRIP AND STATION INDICATOR.

1,133,005.

Specification of Letters Patent. Patented Mar. 23, 1915.

Application filed October 31, 1913. Serial No. 798,385.

*To all whom it may concern:*

Be it known that I, CUSTIS L. CARTER, a citizen of the United States, residing at Charlottesville, in the county of Albemarle and State of Virginia, have invented certain new and useful Improvements in Trip and Station Indicators, of which the following is a specification, reference being had therein to the accompanying drawing.

This invention relates to station and trip indicators and one of the principal objects thereof is to provide means for indicating at what station a car or train is due at a certain time.

Another object is to provide a station indicator comprising a dial adapted to make one revolution during the run of the car, and a stationary pointer for indicating the stations marked on the dial.

A further object is to provide an indicator that may be attached to any clock or watch.

A still further object is to provide an indicator which is durable and efficient in operation and inexpensive to manufacture.

These and other objects may be attained by means of the construction, combination and arrangement of parts as hereinafter more fully described and claimed, and illustrated in the accompanying drawing, in which like characters of reference indicate like parts throughout the several figures, and in which, Figure 1 is a front elevation of the indicator, and Fig. 2 is a top view thereof, parts being shown in section.

My invention comprises generally a graduated and appropriately marked dial, operated by clock work to make one revolution during the course of the trip, whether this is fifteen minutes or several hours long; and a stationary pointer to indicate the stations as they are brought opposite it on the revolving dial.

The embodiment illustrated provides an ordinary clock casing 1, having the usual clock mechanism within it, but having the hands removed, and in place of the minute hand a dial 2 secured.

As is obvious the dial will make one complete revolution during an hour. The stations or stops are printed on the dial as at 3, and as many minutes apart on the dial as it will take minutes to go from one station to the other on schedule time. The pointer 4 is secured between the clock face 5 and the casing 1 in such a way as to overhang the dial.

Considering two of the stations marked on the dial, let us say "E. 4th st.," and "E. 2nd st.;" and supposing them to be a distance apart equal to three minute spaces; when the graduation at "E. 4th st.," opposite the pointer, the train will be at that station, if running on schedule, and three minutes later will be at E. 2nd st., at the time "E. 2nd st.," is opposite the pointer, should the train be ahead of, or behind time, the motorman can ascertain how many minutes off schedule he is, and regulate the speed of his train accordingly.

It will be seen that the device consists essentially of a rotatable dial upon which the series of stops or switches and streets in the line are marked in regular sequence. This dial is revolved by a regular time mechanism so that each switch or station on the dial is in due time brought opposite a pointer fixed at the side of the dial. The stop station or switch marked on the dial which happens to come opposite the pointer shows the point at which the car should be at that moment. For example, if the car was at say Fourth street when the dial shows Fifth street opposite the pointer, the motorman would know that he is one block behind time; or if he was at Sixth street he would know that he is one block ahead of time. This device enables him to keep on exact schedule at all points and times, without consulting his watch or time-table. With this device a number of cars can be operated without difficulty on single track roads, where they have to pass each other at different points or sidings, as each motorman by simply noting the stop indicated by the pointer knows at once where he should be, and whether he is on proper time, and does not have to bother with any time schedule. The dial is adjustable, and whether the time of the run be long or short makes no difference. But if a complete trip requires more than an hour's time for operation, without any intermediate rests, then the clock mechanism could be arranged so that the dial will only make one complete rotation during the time required for the trip. At the beginning of each trip the motorman should shift the dial so that the starting point designated thereon comes opposite the pointer. Thereafter he has no further trouble as regards the time and simply knows whether he is ahead or behind time by observing whether or not he is at the proper point when the name of a designated place on the dial arrives at the pointer.

Although I have described the preferred embodiment of my invention, I reserve, and may exercise the right to make such changes in the construction, combination and arrangement of parts as do not depart from the spirit of the invention or the scope of the appended claims.

Having thus described my invention, what I claim as new, and desire to secure by Letters Patent, is:

1. A time controlled station and trip indicator for cars, comprising a rotatable indicator or dial having the series of stops, switches and stations on the line marked thereon at predetermined intervals in accordance with the location of such stops on the line and the time required or desired to traverse the distances between any two successive stops; with clock mechanism for rotating said dial in regular time, and a stationary pointer adjacent the dial, the registry of any stop on the dial with said pointer showing the point on the line at which the car should be at that time.

2. A time controlled car trip and station indicator, comprising a rotatable indicator disk bearing on its face designations of the stations or points along the line to be traversed by the car in regular sequence, such designations being spaced apart on the dial proportionately to their relative localities and distances apart along the line, a pointer fixed beside the dial opposite which the designations on the dial are successively brought as the dial revolves, and mechanism for rotating said dial in regular time; whereby after the dial has been properly set at the beginning of the trip the registry of any designated stop on the dial with said pointer will show whether the car is at the proper point on the line at that time and whether the car is properly traversing the line; and means whereby said dial can be adjusted so as to bring the initial or starting point indicated on the dial into register with the pointer at the beginning of the trip.

In testimony whereof I affix my signature in presence of two witnesses.

CUSTIS L. CARTER.

Witnesses:
 W. L. COOKE,
 JOHN L. LIVERS.

Copies of this patent may be obtained for five cents each, by addressing the "Commissioner of Patents, Washington, D. C."